Inventor
Baird E. Resener
By Walter F. Schlegel, Jr.
Atty.

United States Patent Office 3,425,724
Patented Feb. 4, 1969

3,425,724
PROTECTIVE COVERING
Baird E. Resener, Indianapolis, Ind., assignor to Amsted Industries Incorporated, Chicago, Ill., a corporation of New Jersey
Filed Aug. 24, 1966, Ser. No. 574,768
U.S. Cl. 287—130
Int. Cl. F16b 4/00, 7/00; B23p 11/00
9 Claims

ABSTRACT OF THE DISCLOSURE

A shrinkable sleeve made out of a substance such as polyolefin is placed over a sprocket wheel of a chain type coupling. The sprocket wheel is then interconnected with a second sprocket wheel by means of a chain and the sleeve is shrunk over the two sprocket wheels and the interconnecting chain to form a protective coupling cover.

---

This invention relates generally to lubricant retaining devices, and more particularly to lubricant retention devices for couplers and similar articles.

The connection of coaxial power transmission shafts is often accomplished by the use of a coupling which will accommodate small angular and/or parallel misalignment between the shafts. Such misalignment causes relative motion between the coupling parts. This motion causes wear, which may be reduced by proper lubrication. To contain the lubricants, housings have been provided which enclose the coupling and its lubricant. Such housings heretofore have (1) comprised one or a number of rigid parts, fabricated of relatively expensive metal or plastic, which must be held in assembled configuration by clamps, bolts or other fasteners, or (2) been fabricated of leather or rubber materials, which must be held in position around the lubricated coupling by means of snap rings or similar clamping devices or fasteners.

It is therefore an object of this invention to provide a relatively inexpensive flexible coupling cover which will (1) retain lubricant, if any, within the housing, and (2) exclude dirt, abrasive material, and corrosive substance from the coupling parts.

Another object is to provide for a coupler or similar article a one-piece housing which may be secured without use of fasteners, clamps, or securing devices of any kind.

A further object is to improve maintenance, safety and esthetic considerations by providing a flexible, transparent, one-piece housing which will allow inspection of the coupling and the lubricant therein without removal of the coupling cover.

A still further object of this invention is to provide a coupling covering device which may be placed about the coupling by means of heat-induced, or chemically induced shrinkage or contraction, thus eliminating the use of snap-rings, screws, or other clamping or fastening devices.

These and other objects and advantages of the invention will become apparent from a reading of the following detailed description when taken in conjunction with the accompanying drawing wherein.

Figure 1:
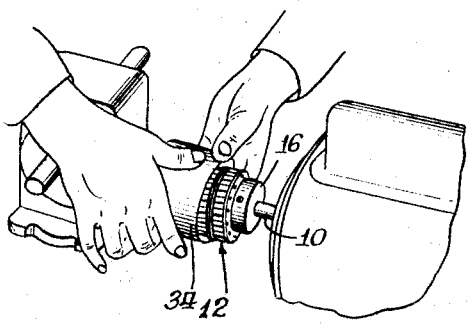
FIGURE 1 is an elevational view showing the shrinkable film sleeve being slipped over the assembled coupling.
Figure 5:
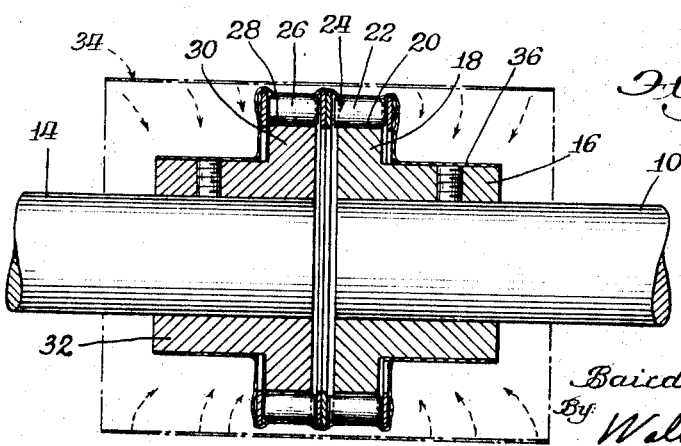
FIGURE 5 is a cross-sectional view of the structure shown in FIGURE 4, showing in detail the various parts of a typical embodiment of my invention.

Referring to FIGURES 1 and 5, reference numeral 10 denotes a drive shaft, powered by an electric motor or other means (not shown). A conventional coupling 12 transmits power from drive shaft 10 to a driven shaft 14. In the present illustration of my invention, such power transmission is accomplished in the following manner: Drive shaft 10 is securely attached by conventional means to the hub 16 of a conventional sprocket wheel 18. Engaging the sprocket wheel teeth 20 is one strand 22 of a conventional double strand roller chain 24. The other strand 26 of the roller chain 24 engages the teeth 28 of sprocket wheel 30. The double strand roller chain 24 is wrapped circumferentially about the sprocket wheels 18 and 30, engaging every tooth 20 and 28 on its sprocket wheel 18 and 30. The hub 32 of sprocket wheel 30 is secured by conventional means to the driven shaft 14.

When drive shaft 10 revolves about its axis, hub 16 and sprocket wheel 18 are also revolved, teeth 20 thus engage and revolve one strand 22 of chain 24. The other strand 26 of chain 24 thus also is made to revolve, engaging teeth 28 of the driven sprocket wheel 30. As wheel 30 revolves, hub 32 and shaft 14 secured thereto are revolved.

Figure 2:
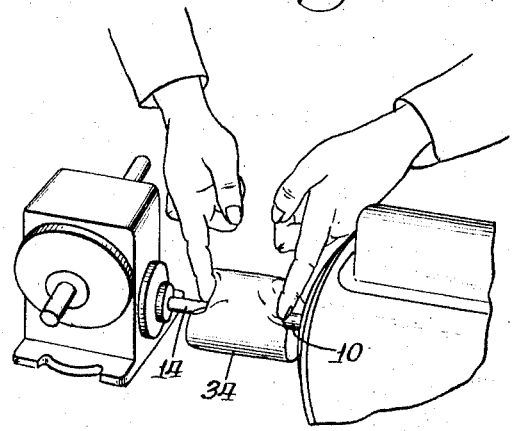
FIGURE 2 is an elevational view showing the shrinkable film sleeve being loosely positioned by hand.
Figure 3:
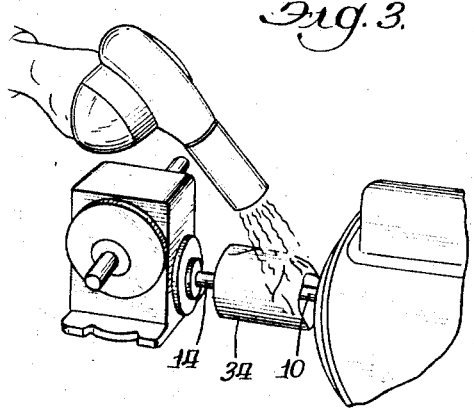
FIGURE 3 is an elevational view showing the shrinkable sleeve being shrunk into permanent position by the application of heat.
Figure 4:
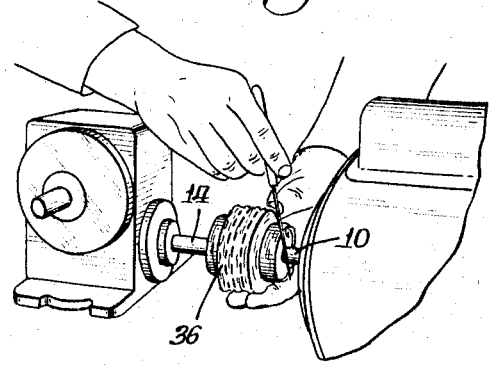
FIGURE 4 is an elevational view showing excess film being trimmed from the shrunk cover.

Surrounding the coupling is a loose sleeve 34, made of a thermoplastic material, which may be polyolefin, polyvinyl chloride, polyethylene or polyester. Before coupling 12 has been completely assembled and lubricated, the loose sleeve 34 is slipped about either shaft 10 or 14. The coupling 12 is then assembled in the conventional manner and the leeve is slipped over the coupling into approximately its final position as shown in FIGURE 1. The sleeve is then emplaced in its final unshrunk position by manipulation as shown in FIGURE 2. The sleeve 34 is then shrunk or collapsed about the coupling 12 by application of heat (as shown in FIGURE 3) or by other shrink-inducing means until the plastic material, in original form a sleeve 34, assumes the position or configuration of a cover 36. Such heat applicatory means may take the form of heated air directed upon the sleeve 34 until it shrinks to become cover 36. Excess thermoplastic material is then trimmed from the cover 36 as shown in FIGURE 4 until the cover appears as shown in FIGURE 5, sealing within coupling 12 any lubricant and shielding the coupling 12 from dirt and corrosive agents.

It will now be discovered that a dirt-tight, lubricant-tight cover has been formed about the coupling. If a translucent material has been used to form the coupling, the quantity and condition of any lubricant contained within the housing may be observed, and the quantity and condition of the lubricant may be examined. The lubricant contained therein may reach all parts of the coupling which requires lubrication with relative ease.

This invention has been described with reference to a coupling between a driving shaft and a driven shaft. It should be understood that this invention has equal application to other types of couplings, joints and other devices wherein lubrication is to be retained, or dust or other protection is desired.

It should also be understood from a reading of the foregoing description of the preferred embodiment of this invention that various modifications may be made without departing from the spirit and scope of this invention as defined by the following claims.

I claim:
1. A protective covering for an article having interconnected moving members comprising a film of plastic-type material, said material being snugly shrunk on and enclosing a section of said members and their area of interconnection.

2. The protective covering set out in claim 1 wherein said article comprises a coupling connecting two members and said film is snugly shrunk on and encloses the coupling and a part of each member.

3. A covering according to claim 2, wherein said film is transparent.

4. The covering set out in claim 2 wherein the enclosure of said coupling is air tight.

5. The covering set out in claim 2 wherein said film is made of a substance selected from the group consisting of polyolefin, polyvinyl chloride, polyester and polyethylene.

6. A covering according to claim 2, wherein said film is translucent.

7. A method of protecting an article having two interconnected moving members from contaminants, comprising the steps of placing a shrinkable film about one of said members, then interconnecting said one member with said other member, and then shrinking said film snugly about said interconnected members.

8. A method of covering a coupling connecting two members comprising the steps of placing one of said members partially within a shrinkable sleeve, then connecting said members by said coupling, then lubricating the coupling, then sliding the sleeve to a position whereat both members and the coupling are within the sleeve, and then shrinking the sleeve so that it snugly confines said members and coupling to prevent escape of lubricant from said coupling.

9. The method set out in claim 8 wherein said sleeve is made of a substance selected from the group consisting of polyolefin, polyethylene, polyvinyl chloride and polyester.

References Cited

UNITED STATES PATENTS

| | | | |
|---|---|---|---|
| 2,227,333 | 12/1940 | Campbell | 64—19 |
| 2,795,038 | 6/1957 | Martiny | 29—460 |
| 2,926,066 | 2/1960 | Lew | 29—460 |
| 3,313,017 | 4/1967 | Zingali | 264—230 X |

HOUSTON S. BELL, JR., *Primary Examiner.*

U.S. Cl. X.R.

184—1